US010782870B1

(12) United States Patent
Kuruba

(10) Patent No.: US 10,782,870 B1
(45) Date of Patent: *Sep. 22, 2020

(54) RESPONSIVE CLINICAL REPORT VIEWER

(71) Applicant: ALLSCRIPTS SOFTWARE, LLC, Chicago, IL (US)

(72) Inventor: Gururaj Kuruba, Bangalore (IN)

(73) Assignee: ALLSCRIPTS SOFTWARE, LLC, Chicago, IL (US)

(*) Notice: Subject to any disclaimer, the term of this patent is extended or adjusted under 35 U.S.C. 154(b) by 172 days.

This patent is subject to a terminal disclaimer.

(21) Appl. No.: 15/859,638

(22) Filed: Dec. 31, 2017

Related U.S. Application Data

(63) Continuation of application No. 14/587,008, filed on Dec. 31, 2014, now Pat. No. 9,864,502.

(51) Int. Cl.
*G06F 3/048* (2013.01)
*G06F 3/0485* (2013.01)
*G06F 3/0483* (2013.01)

(52) U.S. Cl.
CPC ........ *G06F 3/04855* (2013.01); *G06F 3/0483* (2013.01)

(58) Field of Classification Search
CPC ..... G06F 3/048; G06F 3/0483; G06F 3/04855
See application file for complete search history.

*Primary Examiner* — Pei Yong Weng
(74) *Attorney, Agent, or Firm* — Loza & Loza, LLP; Peter Zura

(57) ABSTRACT

A method for reviewing a document using a computing device, the computing device comprising a display for displaying the document in a user interface (UI) and one or more processors, the processor for executing a plurality of computer readable instructions, the computer readable instruction for implementing the method, the method includes displaying to a user within a document one or more pinned indicators, each of the one or more pinned indicators associated with respective certain information in the document, detecting the selection of one of the one or more pinned indicators, directing the user to the certain information associated with the selected pinned indicator, and receiving a confirmation that the user has reviewed the certain information associated with the selected pinned indication.

20 Claims, 6 Drawing Sheets

100            Discharge Summary

Patient Name: Stuart Little DOB: 01 Jan 1990 Facility: ED Physician: Albert Einstein ▓▓▓▓▓▓▓▓▓▓▓▓▓▓▓▓▓ ─135
2. Respiratory distress Click to Acknowledge

Discharge Diagnosis:    1. Status Asthmaticus - resolved
                             2. Respiratory distress – resolved
                             3. Severe persistent asthma - Ongoing

Discharge Condition: Good ～125

Consults: Nutrition

Procedures: None

Brief History of Present Illness: This is a 4 year old femalre with history of asthma who presented to the ED for increased work of breathing for 2 days. Assocaited sysmptoms included dry cough, rhinorrhea, nasal congestion and tactile fever. Patient initially iimproved on home nebulizer treatments of albuterol until mother ran out of medication.

Hospital Course: Patient required continuous nebulization treatments in the ER and had an oxygen requirement of 6L. Once patient transferred to floow, she tolrerated 5mg Q2 hr treatments x 2. Her oxygen requirement decreased to 2L via nasal cannula. She was weaned to room air within the first 24 hours and her treatments were spaced 2.5mg q2 hr. ▓▓▓▓▓▓▓▓▓▓▓▓▓▓▓▓▓▓▓▓▓▓▓▓▓▓▓▓▓ ▓▓▓▓▓▓▓▓▓▓▓▓▓▓▓▓▓▓▓▓▓▓▓. We offered a nasal cortiscosteroid, which Mom refused due to difficulty with patient cooperation. Nutrition evaluated patient and educated parent. The ward team also discussed healthy choices and exercise with mom as well as provided asthma education and action plan.

Physical Examination at Discharge:
T:99.3F BP 105/62 HR 110 RR 24 Weight 30kg
General: Awake, alert, no apparent distress
HEENT: Normocephalic, atraumatic. Hyperpigmentation beneath eyes. Mucus membranes moist.
CVS: Regular rate and rhythm. No murmurs appreciated.
Respiratory▓▓▓▓▓▓▓▓▓▓▓▓ No accessory muscle use. Prolonged expiratory phase. End expiratory wheeze. Good air entry bilaterally.  ─135
Abdomen: Normoactive bowel sounds. Soft. Non-tender, non-distended.
Extremities: Pulses present.
Skin: No rashes. Capillary refill brisk.
Neuro: No focal deficits ▓▓▓▓▓▓▓▓▓▓▓▓▓▓▓▓▓▓▓▓▓▓▓▓▓▓▓▓▓▓▓▓▓▓▓▓▓▓▓▓▓▓▓▓▓▓▓▓▓▓▓▓
              2: Prednisolone (15mg/5ml) 10 ml pl BID x 4 days
              3: Singulair 4mg po Qhs
              4: Flovent HFA (44mcg/actuation) 2 puffs inh Qam

Diet: Low fat
Follow Up: Pediatrician-Dr. Smith at Lled Clinic on Nov 5th at 10:30am. (555-5555)
Instructions: Return to the ER or call Pediatrician if patinet is appearing more tired than usual, has had no wet diapers in six hours, worsening diarrhea or vomiting or any other concerns.

FIG. 1

200                   Discharge Summary

Patient Name: Stuart Little  DOB: 01 Jan 1990  Facility: ED  Physician: Albert Einstein

[redacted] ⎯235
2. Respiratory distress

Discharge Diagnosis: 1. Status Asthmaticus - resolved
                         2. Respiratory distress – resolved
                         3. Severe persistent asthma - Ongoing

Discharge Condition: Good ⎯225

Consults: Nutrition

Procedures: None

Brief History of Present Illness: This is a 4 year old female with history of asthma who presented to the ED for increased work of breathing for 2 days. Associated sysmptoms included dry cough, rhinorrhea, nasal congestion and tactile fever. Patient initially iimproved on home nebulizer treatments of albuterol until mother ran out of medication.

Hospital Course: Patient required continuous nebulization treatments in the ER and had an oxygen requirement of 6L. Once patient transferred to floow, she tolrerated 5mg Q2 hr treatments x 2. Her oxygen requirement decreased to 2L via nasal cannula. She was weaned to room air within the first 24 hours and her treatments were spaced 2.5mg q2 hr. She was found to have allergic rhinitis on exam and was prescribed singular, which she tolerated. We offered a nasal cortiscosteroid, which Mom refused due to difficulty with patient cooperation. Nutrition evaluated patient and educated parent. The ward team also discussed healthy choices and exercise with mom as well as provided asthma education and action plan.                                215

Physical Examination at Discharge:
T:99.3F BP 105/62 HR 110 RR 24 Weight 30kg
General: Awake, alert, no apparent distress
HEENT: Normocephalic, atraumatic. Hyperpigmentation beneath eyes. Mucus membranes moist.
CVS: Regular rate and rhythm. No murmurs appreciated.
Respiratory [redacted] No accessory muscle use. Prolonged expiratory phase. End expiratory wheeze. Good air entry bilaterally. ⎯235
Abdomen: Normoactive bowel sounds. Soft. Non-tender, non-distended.
Extremities: Pulses present.
Skin: No rashes. Capillary refill brisk.
Neuro: No focal deficits   ⎯235

[redacted]
2: Prednisolone (15mg/5ml) 10 ml pl BID x 4 days
3: Singulair 4mg po Qhs
4: Flovent HFA (44mcg/actuation) 2 puffs inh Qam

Diet: Low fat
Follow Up: Pediatrician-Dr. Smith at Lled Clinic on Nov 5<sup>th</sup> at 10:30am. (555-5555)
Instructions: Return to the ER or call Pediatrician if patinet is appearing more tired than usual, has had no wet diapers in six hours, worsening diarrhea or vomiting or any other concerns.

FIG. 2

Discharge Summary

300

310

Patient Name: Stuart Little DOB: 01 Jan 1990 Facility: ED Physician: Albert Einstein

330

▓▓▓▓▓▓▓▓▓▓▓▓▓▓▓▓▓▓ 335₁   320

2. Respiratory distress   330₁

330

Discharge Diagnosis:  1. Status Asthmaticus - resolved
                             2. Respiratory distress -- resolved   370₁
                             3. Severe persistent asthma - Ongoing

Discharge Condition: Good 325

320

Consults: Nutrition

Procedures: None

370

Brief History of Present Illness: This is a 4 year old femalre with history of asthma who presented to the ED for increased work of breathing for 2 days. Assocaited sysmptoms included dry cough, rhinorrhea, nasal congestion and tactile fever. Patient initially iimproved on home nebulizer treatments of albuterol until mother ran out of medication.

Hospital Course: Patient required continuous nebulization treatments in the ER and had an oxygen requirement of 6L. Once patient transferred to floow, she tolrerated 5mg Q2 hr treatments x 2. Her oxygen requirement decreased to 2L via nasal cannula. She was weaned to room air within the first 24 hours and her treatments were spaced 2.5mg q2 hr. ▓▓She was found to have allergic rhinitis on exam and was prescribed singular, which she tolerated.▓▓ We offered a nasal cortiscosteroid, which Mom refused due to difficulty with patient cooperation. Nutrition evaluated patient and educated parent. The ward team also discussed healthy choices and exercise with mom as well as provided asthma education and action plan.

335   330

370

Physical Examination at Discharge:
T:99.3F BP 105/62 HR 110 RR 24 Weight 30kg   310₂
General: Awake, alert, no apparent distress
HEENT: Normocephalic, atraumatic. Hyperpigmentation beneath eyes. Mucus membranes moist.   330
CVS: Regular rate and rhythm. No murmurs appreciated.
Respiratory: ▓▓▓▓▓▓▓▓▓▓ No accessory muscle use. Prolonged expiratory phase. End expiratory wheeze. Good air entry bilaterally.
Abdomen: Normoactive bowel sounds. Soft. Non-tender, non-distended.   320
Extremities: Pulses present.
Skin: No rashes. Capillary refill brisk.
Neuro: No focal deficits ▓▓▓▓▓▓▓▓▓▓▓▓▓▓▓▓▓▓▓▓▓▓▓▓▓▓▓▓▓▓▓▓▓▓▓▓▓▓▓▓▓▓▓▓   370
▓▓▓▓▓▓
        2: Prednisolone (15mg/5ml) 10 ml pl BID x 4 days
        3: Singulair 4mg po Qhs
        4: Flovent HFA (44mcg/actuation) 2 puffs inh Qam

Diet: Low fat   350
Follow Up: Pediatrician-Dr. Smith at Lled Clinic on Nov 5th at 10:30am. (555-5555)
Instructions: Return to the ER or call Pediatrician if patinet is appearing more tired than usual, has had no wet diapers in six hours, worsening diarrhea or vomiting or any other concerns.

PROCEDURES PERFORMED: The patient hada a chest x-ray, which showed cardiomegaly with atherosclerotic heart disease, plural thickening and small pleural effusion, a left costophrenic angle which has not changed which compared to prior examination, COPD pattern. The patient also had ahead CT which showed atrophy with old ischemic changes. No acute intracranial findings.     470

CONSULTS OBTAINED: A rehab consult was done.     420

470

PAST MEDICAL/SURGICAL HISTORY: Positive for atrial fibrillation. The patient had AVR 6 years ago. Peripheral arterial disease with hypertension, peripheral neuropathy, atherosclerosis, hemorrhoids, proctitis, CABG, and cholecystectomy.

FAMILY HISTORY: Positive for atherosclerosis, hypertension, autoimmune diseases in the family.

470

SOCIAL HISTORY: Never smoked. Alcohol socially. No Drugs.

ALLERGIES: NO KNOWN DRUG ALLERGIES.     430

420

REVIEW OF SYSTEMS: Weight loss of 25 pounds within the last 6 months, shortness of breath, constipation, bleeding from hemorrhoids, increased frequency of urination, muscle aches, dizziness and faintness, focal weakness and numbness in both legs, knees and feet.

LABORATORY DATA AND RADIOLOGICAL RESULTS: WBC 8.6, hemoglobin 13.4, hematocrit 39.8, platelets 207,000 MCV91.6,     450
neutrophil

PROCEDURES PERFORMED: The patient had a chest x-ray, which showed cardiomegaly with atherosclerotic heart disease, pleural thickening and small pleural effusion, a left costophrenic angle which has not changed which compared to prior examination, COPD pattern. The patient also had a head CT which showed atrophy with old ischemic changes. No acute intracranial findings.

CONSULTS OBTAINED: A rehab consult was done.

Medications: Albuterol 5mg SVN q4hr x 2 days then q4hr prn shortness of breath/breathing difficulties.

FAMILY HISTORY: Positive for atherosclerosis, hypertension autoimmune diseases in the family.

SOCIAL HISTORY: Never smoked. Alcohol socially. No Drugs.

ALLERGIES: NO KNOWN DRUG ALLERGIES.

REVIEW OF SYSTEMS: Weight loss of 25 pounds within the last 6 months, shortness of breath, constipation, bleeding from hemorrhoids, increased frequency of urination, muscle aches, dizziness and faintness, focal weakness and numbness in both legs, knees and feet.

LABORATORY DATA AND RADIOLOGICAL RESULTS: WBC 8.0, hemoglobin 13.4, hematocrit 39.8, platelets 207,000 MCV91.8, neutrophil.

FIG. 5

RESPONSIVE CLINICAL REPORT VIEWER

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

BACKGROUND OF THE INVENTION

The present invention relates to a mobile device. More specifically, the present invention relates to the use of a mobile device within a medical facility.

In a medical facility, one of the critical jobs for caring physicians, clinicians, analysts, etc., is creating and reviewing patient notes before the note is routed to the next level. Electronic health records are capable of generating patient clinical reports (e.g., a Discharge summary) that can be as short as one page, or as long as 20-30 pages. In a typical clinical workflow, the attending nurse documents the initial observations of the patient like vitals, chief complaint, review of system, social history, family history, etc. before routing the notes to the physician. The physician completes the assessment and plan, etc., reviews the entire note and signs off the note to the billing department.

As indicated, patient clinical reports can be as long as 20 to 30 pages. An attending nurse, for example, indicates a patient critical observation in the clinical notes to alert the attending physician. Currently, there is no way to ensure that the physician does not miss the patient critical information, nor is there a way to ensure/enforce the physician to review these critical areas before the note can be routed to the next level.

Therefore, there exists a need for an improved method for electronic document. This and other needs are addressed by one or more aspects of the present invention.

SUMMARY OF THE INVENTION

The present invention includes many aspects and features. Moreover, while many aspects and features relate to, and are described in, the context of healthcare applications, the present invention is not limited to use only in this context, as will become apparent from the following summaries and detailed descriptions of aspects, features, and one or more embodiments of the present invention.

Accordingly, one aspect of the present invention relates to method for reviewing a document using a computing device, the computing device comprising a display for displaying the document in a user interface (UI) and one or more processors, the processor for executing a plurality of computer readable instructions, the computer readable instruction for implementing the method. The method includes displaying to a user within a document one or more pinned indicators, each of the one or more pinned indicators associated with respective certain information in the document, detecting the selection of one of the one or more pinned indicators, directing the user to the certain information associated with the selected pinned indicator, and receiving a confirmation that the user has reviewed the certain information associated with the selected pinned indication.

In a feature of this aspect, each of the one or more pinned indicators includes a scroll bar indicator, the scroll bar indicator displayed in a scroll bar in the UI.

In another feature of this aspect, the user is directed to the certain information comprises automatically scrolling the document to the location of the certain information associated with the scroll bar indicator.

In another feature of this aspect, each of the one or more pinned indicators further includes an in-doc indicator, wherein the in-doc indicator visually highlights the certain information associated with the pinned indicator.

In another feature of this aspect, the method further includes receiving an indication that certain information in the document has been selected to be pinned, and generating the pinned indicator associated with the selected certain information.

In another feature of this aspect, generating the pinned indicator comprises, generating the in-doc indicator including visually highlighting the selected certain information, and generating and displaying the scroll bar indicator such the scroll bar indicator visually indicates where in the document the selected certain information is located.

In another feature of this aspect, the method further includes requesting the user confirm that the certain information associated with the selected pinned indicator has been reviewed by the user, and generating a confirm indicator when the confirmation has been received, wherein the confirm indicator is visually displayed next to the scroll bar indicator associated with the certain information.

In another feature of this aspect, the user is prevented from routing the document when one or more pinned indicators have not been confirmed by the user.

Another aspect of the present invention relates to a computing device comprising a display for displaying a document over a user interface (UI) and one or more processors, the one or more processors for executing a plurality of computer readable instructions, the computer readable instructions for implementing a method for reviewing the document, the method comprising the steps of displaying to a user within a document one or more pinned indicators, each of the one or more pinned indicators associated with respective certain information in the document, detecting the selection of one of the one or more pinned indicators, directing the user to the certain information associated with the selected pinned indicator, and receiving a confirmation that the user has reviewed the certain information associated with the selected pinned indication.

In a feature of this aspect, each of the one or more pinned indicators includes a scroll bar indicator, the scroll bar indicator displayed in a scroll bar in the UI.

In another feature of this aspect, the user is directed to the certain information comprises automatically scrolling the document to the location of the certain information associated with the scroll bar indicator.

In another feature of this aspect, each of the one or more pinned indicators further includes an in-doc indicator, wherein the in-doc indicator visually highlights the certain information associated with the pinned indicator.

In another feature of this aspect, the method further includes receiving an indication that certain information in the document has been selected to be pinned, and generating the pinned indicator associated with the selected certain information.

In another feature of this aspect, generating the pinned indicator comprises, generating the in-doc indicator including visually highlighting the selected certain information, and generating and displaying the scroll bar indicator such the scroll bar indicator visually indicates where in the document the selected certain information is located.

In another feature of this aspect, the method further includes requesting the user confirm that the certain information associated with the selected pinned indicator has been reviewed by the user, and generating a confirm indicator when the confirmation has been received, wherein the confirm indicator is visually displayed next to the scroll bar indicator associated with the certain information.

In another feature of this aspect, the user is prevented from routing the document when one or more pinned indicators have not been confirmed by the user.

In another feature of this aspect, the pinned indicator is color coded to indicate the level of criticality of the certain information associated with the pinned indicator.

In another feature of this aspect, the computing device is a mobile device.

Another aspect of the prevention relates to a method for generating a document to be reviewed in a user interface, the user interface displayed over a computing device, the computing device comprising one or more processors for executing an application, the application comprising a plurality of computer readable instructions for implementing the method, the method including the steps of receiving an indication that certain information in the document has been selected to be pinned, generating a pinned indicator associated with the selected certain information, and visually displaying the generated pinned indicator in the document.

In a feature of this aspect, the pinned indicator comprises a scroll bar indicator for visually indicating the location of the selected certain information in the document, and an in-doc indicator for highlighting the selected certain information in the document.

In another feature of this aspect, the scroll bar indicator is displayed to a user as a mark in a scroll bar in the UI.

In another feature of this aspect, the pinned indicator is color coded to indicate the level of criticality of the selected certain information.

In addition to the aforementioned aspects and features of the present invention, it should be noted that the present invention further encompasses the various possible combinations and subcombinations of such aspects and features. Thus, for example, any aspect may be combined with an aforementioned feature in accordance with the present invention without requiring any other aspect or feature.

BRIEF DESCRIPTION OF THE DRAWINGS

One or more preferred embodiments of the present invention now will be described in detail with reference to the accompanying drawings, wherein the same elements are referred to with the same reference numerals, and wherein, FIG. 1 is an example illustration of an implementation of the disclosed responsive report viewer in accordance with the present invention;

FIG. 2 is an example illustration of an implementation of the responsive report viewer shown in FIG. 1 after a user has acknowledged reviewing pinned information;

FIG. 3 is an example illustration of an implementation of the disclosed responsive report viewer including a document that is multiple pages in length;

FIG. 4 is an example illustration of an implementation of the disclosed responsive report viewer of FIG. 3 when a user has selected one of the multiple pages to review;

FIG. 5 is an example illustration of an implementation of the disclosed responsive report viewer wherein the user has placed the cursor over a pinned indicator for previewing.

DETAILED DESCRIPTION

Figure 6:
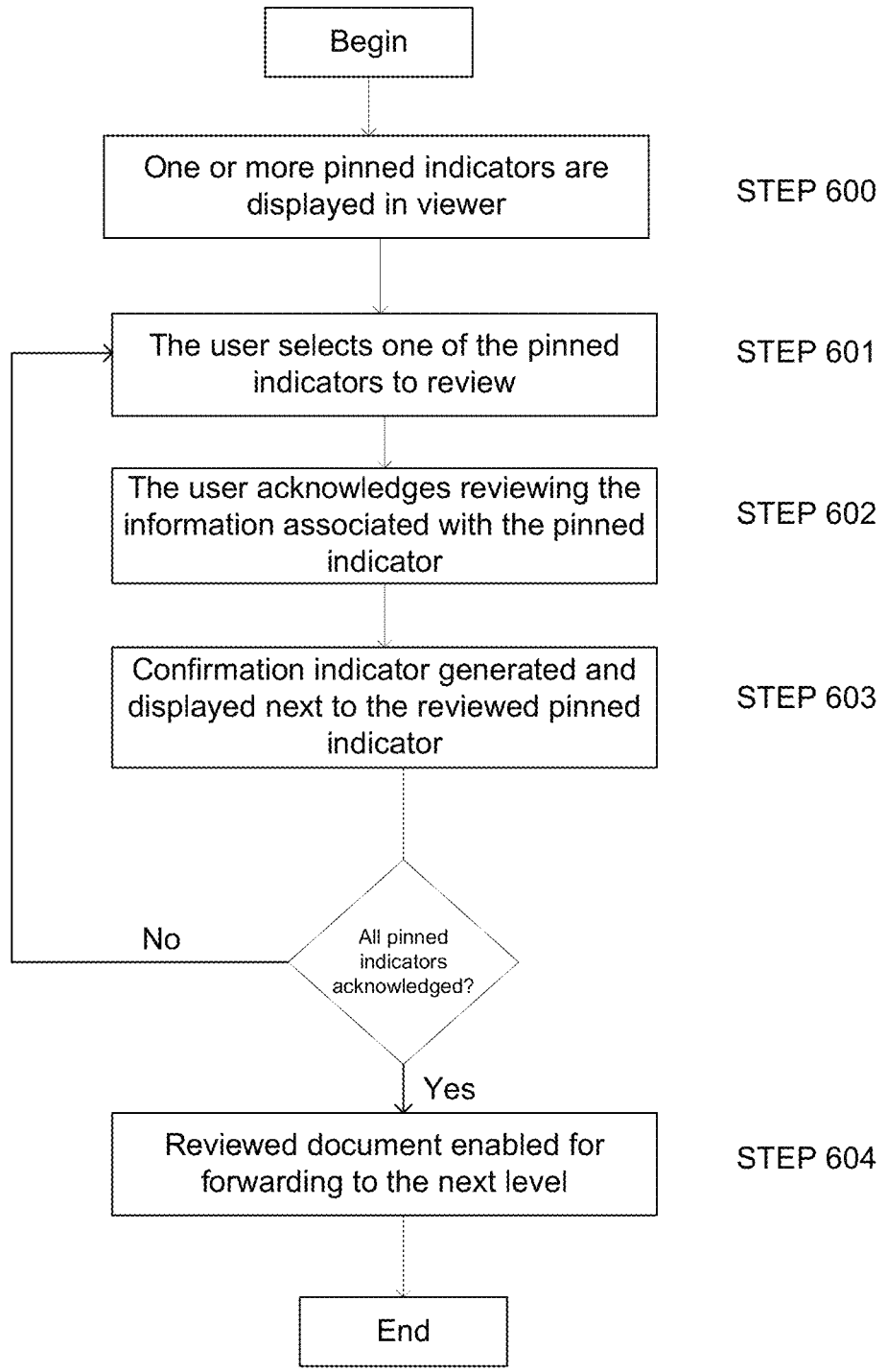
FIG. 6 is an example flow diagram of a disclosed method for reviewing a document in accordance with an implementation of the responsive report viewer.

Referring now to the drawings, one or more preferred embodiments of the present invention are next described. The following description of one or more preferred embodiments is merely exemplary in nature and is in no way intended to limit the invention, its implementations, or uses.

As a preliminary matter, it will readily be understood by one having ordinary skill in the relevant art ("Ordinary Artisan") that the present invention has broad utility and application. As should be understood, any embodiment may incorporate only one or a plurality of the above-disclosed aspects of the invention and may further incorporate only one or a plurality of the above-disclosed features. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. As should be understood, any embodiment may incorporate only one or a plurality of the above-disclosed aspects of the invention and may further incorporate only one or a plurality of the above-disclosed features. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

A computing device may be any type of device configured to operate and/or communicate in a wired and/or wireless environment. By way of example, the computing device may be configured to transmit and/or receive wireless signals and may include a smartphone, a laptop, a netbook, a tablet, a personal computer and the like. The computing device includes a memory for storing, for example, an interactive application, and a processor.

The interactive application (software) comprises a set of machine readable code stored on a machine readable medium and is executed by a processor included in the computing device. The application provides user interface tools in the form of graphical screen displays which allow the user to access information.

An implementation of the disclosed responsive clinical report viewer assists clinicians, caregivers, billing providers, etc., in quickly reviewing critical areas of the patient notes or discharge summary with intuitive navigational options. In accordance with the disclosed implementation, an computing device includes one or more processors for executing a software application. The software application includes a plurality of computer readable instructions for executing the disclosed responsive clinical report viewer.

An example illustration of an implementation of the clinical report viewer overlaid in an EMR system is shown in FIG. 1. FIG. 1 is an example Discharge Summary displayed within the responsive report viewer 100. The clinical report viewer 100 preferably allows a user to include a plurality of pinned indicators directly on the document being reviewed, in this example the Discharge Summary. The pinned indicators may include in-doc indicators 115, 125, 135 and/or scrollbar indicators 110, 120, 130. The pinned indicators 110, 120, 130, 115, 125, 135 identify those areas of a Discharge Summary that a health care provider needs to be aware of when reviewing the responsive report viewer 100, e.g., critical information. Preferably, the pinned indicators 110, 120, 130, 115, 125, 135 also indicate to the healthcare provider the level of criticality of the information associated with the indicator 110, 120, 130, 115, 125, 135.

The in-doc indicators 115, 125, 135 identify the critical information directly on the critical information. As illustrated in FIG. 1, "Admitting Diagnosis: 1. Cardiac arrest" is identified by the in-doc indicator 135. The in-doc indicators 115, 125, 135 may be any indication that can be placed directly on the critical information itself. For example, the information may be highlighted or an icon placed on or next to the information, for example an arrow. In the example Discharge Summary, the in-doc indicators 115, 125, 135 identify the critical information with highlighting.

The scroll indicators 110, 120, 130 identify where in the document critical information is located. When the user of the responsive report viewer 100 identifies the critical information and generates an in-doc indicator 115, 125, 135, scroll indicators 110, 120, 130 are preferably automatically generated. The scroll indicators 110, 120, 130 are located in the scroll bar 150 adjacent to the critical information in the document. As illustrated in FIG. 1, the scroll indicator 130, located in the scroll bar 150, is adjacent to the in-doc indicator 135, which highlights the critical information "Admitting Diagnosis: 1. Cardiac arrest". Similarly, the scroll indicator 120, located in the scroll bar 150, is adjacent to the in-doc indicator 125, which highlights the critical information "Discharge Condition: Good".

In an implementation of the disclosed responsive report viewer, the level of criticality may be indicated to the reviewing user of the responsive report viewer 100 using color coding, for example. In the example illustrated in FIG. 1, pinned indicators 110, 115, illustrated in dark grey, indicates to the healthcare provider that the information associated with the indicator 110, 115 is very critical. The pinned indicators 120, 125, illustrated in medium grey, indicates to the healthcare provider that the information is important but not as critical as pinned indicators 110, 115. The pinned indicators 130, 135, illustrated in light grey, indicates to the healthcare provider that the information needs to be reviewed but is not as critical as the others. Although the pinned indicators 110, 120, 130, 115, 125, 135 are shown in dark grey, medium grey, and light grey, on a color display the color coding may be displayed as red, yellow and green, respectively.

As indicated above, there is a real need to make sure that all critical information has been reviewed by the user reviewing a document. In an implementation of the disclosed responsive report viewer 100, the user must acknowledge that the critical information has been made. As illustrated in FIG. 1, the user may be required by the application to acknowledge that the information was reviewed by clicking on the pinned indicator associated with the information. In the example shown in FIG. 1, the user must click on the in-doc indicator to acknowledge reviewing the information. Acknowledgement of reviewing the information though may also be accomplished by hovering over the in-doc indicator 115, 125, 135, which would indicate to the processor that the information is being, or has been, reviewed by the user. Those having skill in the art know that other methods of confirming that the user has reviewed the information associated with the pinned indicators are available, and are therefore within the scope of the disclosed responsive report viewer.

In an alternative implementation, the user may be required only to confirm reviewing those pinned indicators that represent a high level of criticality. For example, all red and yellow pinned indicators, pinned indicators 110, 115, 130, 135 in the example illustrated in FIG. 1, may required the user to acknowledge that the information associated with these indicators have been reviewed. All green pinned indicators, pinned indicators 120, 125 in FIG. 1, may not require confirmation due to the lower level of criticality. The requirement to acknowledge the review of the information associated with the pinned indicators helps to ensure that the user, e.g., healthcare provider, has reviewed all critical information in the document, e.g., Discharge Summary.

In accordance with a feature of the disclosed implementation, once the user reviews and acknowledges the review of the information associated with a pinned indicator, a confirm indicator is displayed on the responsive report viewer that visually indicates to the user that the critical information associated with the pinned indicator has been reviewed. An example illustration of responsive report viewer 200 including pinned indicators 210, 215, 220, 225, 230, 235 and a confirmation indicator 260 is shown in FIG. 2. The healthcare provider in this example has confirmed reviewing the critical information associated with pinned indicators 210, 215. Once the healthcare provider has confirmed this, the confirm indicator 260 is displayed to the user. In this example, the confirm indicator 260 is located next to the scroll indicator 210, providing the healthcare provider with a visual indication that he/she has reviewed the information associated with the pinned indicator 210. Although the confirm indicator 260 is illustrated as a check mark, any visual indication may be used to visually confirm to the user that the information has be reviewed.

In an alternative implementation, when the user confirms reviewing the information associated with a pinned indicator, the pinned indicator may be removed from the responsive report viewer. Alternatively, when the user confirms the review of the information, only the scroll indicator is removed from the response report viewer. Each of these alternatives confirms to the user which of the pinned indicators have not been reviewed.

As those skilled in the art know, many documents do not include only one page. Therefore, in another implementation of the disclosed responsive report viewer, the responsive report reviewer may include page number indicators. When the document runs into multiple pages, the page numbers are displayed as page number indicators on the horizontal scroll bar. This allows the user to have a quick view of all the scroll indicators and their respective criticality across the entire document. An example illustration of this implementation is shown in FIG. 3.

As illustrated, the Discharge Summary includes multiple pages, for example four (4) pages. In accordance this implementation, the Responsive Report Viewer 300 includes a plurality of pinned indicators 310, 320, 330, 315, 325, 335 and page indicators 370. The in-doc indicators 315, 325, 335 highlight the critical information on the currently viewed page of the Discharge Summary. As exemplified, the scroll indicators 310, 320, 330 indicate to the user that selected information must be reviewed by the user and is located on one of the pages at that location. For example, scroll indicator $330_1$, associated with the critical information highlighted by in-doc indicator $335_1$, is related to the current page being viewed.

Scroll indicator $310_2$, conversely, is not adjacent to an associated in-doc indicator. Accordingly, scroll indicator $310_2$ indicates to the healthcare provider that there is an associated in-doc indicator on a different page in the document.

It is preferable that for a scroll indicator associated with information on a different page than currently displayed, the scroll indicator be displayed near the page indicator on which the information associated with the scroll indicator is associated. For example, in FIG. 3, the scroll indicator $310_2$ is associated with information located on Page 4 of the Discharge Summary.

As indicated, the page indicators 370 allow the user to select the page indicator 370 associated with the page the user is interested in reviewing. For example, the user may select the page indicator 370 that is identified as "4". When the user selects the page indicator 370, the application takes the user to the document page associated with the selected page indicator 370, for example page 4. It is preferable that the page indicator 370 of the current page being displayed to the user is darker in color than the other page indicators 370 to visually indicate to the user what page he/she is reviewing, as exemplified by page indicator $370_1$.

As indicated, when the user selects a page indicator 370, for example , the application jumps to page 3, and displays the contents of the page to the user. An example of the displayed screen of the Responsive Report Viewer 400 in accordance with this feature of the implementation is illustrated in FIG. 4. As illustrated, there are no pinned indicators on page 3 of the Discharge Summary, which was also illustrated by the scroll bar 350 shown in FIG. 3.

It is preferable that when the responsive report viewer jumps to the selected page, the scroll indicators are rearranged such that any scroll indicators associated with critical information on the respective page is located adjacent to the critical information in the scroll bar.

As indicated above, when the user land on a page that includes critical information, the user may be required to acknowledge that the information has been reviewed. When the user acknowledges the review of the critical information, a confirm indicator is displayed, indicating that the information associated with the scroll indicator has been reviewed.

In another feature of the disclosed implementation, the user is able to review the identified critical information prior to going to the page where the critical information exists. An example illustration of this feature is shown in FIG. 5. As illustrated, the user may place a cursor 577 over a scroll indicator 530 in the scroll bar 550. When the cursor 577 is placed over the scroll indicator 530, the information 580 associated with the scroll indicator 530 is displayed in the UI, preferably as a pop up message. The information 580 is displayed to the user for as long as the user holds the cursor 577 over the scroll indicator 530. It is preferable that when the information 580 is displayed in the pop up message, the page 570 being displayed is muted in the background.

In order for the user to confirm that the information 580 has been reviewed, the user must select the scroll indicator 530 by clicking on the scroll indicator 530 using the cursor 577. When the user clicks on the scroll indicator 530, the page including the information 580 is displayed to the user. As indicated above, the user must then click on the information and acknowledge that the information has been reviewed.

In accordance with the disclosed implementation, it is preferable that the user acknowledge reviewing all information that has been pinned prior to routing the document to another person. For example, in a healthcare facility wherein the document being reviewed by a healthcare provider is a Discharge Summary as illustrated in FIG. 2, the healthcare provider is preferably required to confirm reviewing all of the pinned indicators 215, 225, 235 that have been displayed to the user within the Responsive Report Viewer 200, i.e, a confirm indicator 260 next to each scroll indicator 210, 220, 230 as illustrated in FIG. 2. Once the viewer detects that all information has been reviewed by the healthcare provider, the document, e.g., Discharge Summary, can be routed to the next level.

An example flow diagram of the disclosed implementation of the Responsive Report Viewer is illustrated in FIG. 6. The responsive report viewer displays one or more pinned indicators in the UI that indicate the location of important information that has been identified by a first user. STEP 600. The user then reviews the document within the responsive report viewer and selects one of the one or more pinned indicators. STEP 601. After the user reviews the information associated with the pinned indicator, the user acknowledges reviewing the information, STEP 602, and a confirm indication is displayed in the UI next to the pinned indicator associated with the confirmed information. STEP 603.

If all of the pinned indicators have not been acknowledged, the user selects another pinned indicator for review. STEP 601. Once all of the pinned indicators have been acknowledged by the user, the document may be forwarded to the next level. STEP 604.

The disclosed implementation provides protection against physicians/clinicians missing critical information in a clinical document, especially when the document is greater than 10 to 15 pages long. The visual indicators provided to the user indicating the location of important information within the document assist the user with making sure that the information is found and reviewed. Further, a user/physician is able to glance through the indicators to ensure that all pinned information has been acknowledged. If all information has not been acknowledged, the document cannot be signed or routed to the next level, preventing the user from skipping information in the document.

Another advantage of the responsive report viewer is that it may also be used by a billing analyst navigate through the document to locate the billable item codes, for example, problem, medication, etc., helping to ensure that the right amount is billed and/or reimbursed to the patient and the physicians.

Based on the foregoing description, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention. Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements, the present invention being limited only by the claims appended hereto and the equivalents thereof

What is claimed is:

1. A method for displaying a document over a user interface (UI) for review, the method comprising the steps of:
   (a) displaying, within a clinical report viewer
      (i) a medical discharge summary document for signature,
      (ii) a plurality of in-doc indicators each in-doc indicator being associated with, and being displayed adjacent to, respective certain information in the medical discharge summary document, and
      (iii) a plurality of scroll indicators, each scroll indicator corresponding to a respective in-doc indicator;
   (b) detecting the selection of one of the plurality of scroll indicators;
   (c) for each respective in-doc indicator of the plurality of in-doc indicators,
      (i) receiving, at the computing device from the healthcare provider user, user input comprising a click on the respective in-doc indicator representing a confirmation that the certain information associated with the respective in-doc indicator has been reviewed,
      (ii) in response to the received user input comprising a click on the respective in-doc indicator, updating the clinical report viewer to display a respective confirm indicator associated with the scroll indicator corresponding to the respective in-doc indicator, the respective confirm indicator visually indicating that the respective in-doc indicator has been reviewed;
   (d) programmatically determining, by the clinical report viewer, that all of the in-doc indicators have been reviewed, and, based thereon, enabling signing and forwarding of the medical discharge summary document onward to a next level;
   (e) receiving, at the computing device from the healthcare provider user, user input corresponding to signing and forwarding the medical discharge summary document, wherein the medical discharge summary document cannot be signed and forwarded until all of the in-doc indicators have been reviewed; and
   (f) electronically effecting forwarding of the signed medical document.

2. The method of claim 1, wherein the computing device is a mobile device.

3. The method of claim 1, wherein each of the in-doc indicators comprises highlighting.

4. The method of claim 1, wherein each of the in-doc indicators comprises an icon.

5. The method of claim 1, wherein each of the in-doc indicators comprises an arrow.

6. The method of claim 1, wherein one or more of the indicators are color-coded.

7. The method of claim 1, wherein one or more of the indicators are color-coded to indicate a level of criticality.

8. The method of claim 1, wherein one or more of the indicators are color-coded red.

9. The method of claim 1, wherein one or more of the indicators are color-coded yellow.

10. The method of claim 1, wherein one or more of the indicators are color-coded green.

11. A method for displaying a document over a user interface (UI) for review, the method comprising the steps of:
   (a) displaying, via a display of a computing device, within a clinical report viewer
      (i) a patient clinical report for signature,
      (ii) a plurality of in-doc indicators each in-doc indicator being associated with respective certain information in the patient clinical report, and
      (iii) a plurality of scroll indicators, each scroll indicator corresponding to a respective in-doc indicator;
   (b) detecting the selection of one of the plurality of scroll indicators;
   (c) for each respective in-doc indicator of the plurality of in-doc indicators,
      (i) receiving, at the computing device from the healthcare provider user, user input comprising a click on the respective in-doc indicator representing a confirmation that the certain information associated with the respective in-doc indicator gas been reviewed,
      (ii) in response to the received user input comprising a click on the respective in-doc indicator, updating the clinical report viewer to display a respective confirm indicator adjacent to the scroll indicator corresponding to the respective in-doc indicator, the respective confirm indicator visually indicating that the respective in-doc indicator has been reviewed;
   (d) programmatically determining, by the clinical report viewer, that all of the in-doc indicators have been reviewed, and, based thereon, enabling signing and forwarding of the patient clinical report onward to a next level;
   (e) receiving, at the computing device from the healthcare provider user, user input corresponding to signing and forwarding the patient clinical report, wherein the patient clinical report cannot be signed and forwarded until all of the in-doc indicators have been reviewed; and (f) electronically effecting forwarding of the signed medical document.

12. The method of claim 11, wherein the computing device is a mobile device.

13. The method of claim 11, wherein each of the in-doc indicators comprises highlighting.

14. The method of claim 11, wherein each of the in-doc indicators comprises an icon.

15. The method of claim 11, wherein each of the in-doc indicators comprises an arrow.

16. The method of claim 11, wherein one or more of the indicators are color-coded.

17. The method of claim 11, wherein one or more of the indicators are color-coded to indicate a level of criticality.

18. The method of claim 11, wherein one or more of the indicators are color-coded red.

19. The method of claim 11, wherein one or more of the indicators are color-coded yellow.

20. The method of claim 11, wherein one or more of the indicators are color-coded green.

\* \* \* \* \*